(12) United States Patent
Rosenhahn et al.

(10) Patent No.: US 7,294,191 B2
(45) Date of Patent: Nov. 13, 2007

(54) PURE-COLOURED, READILY DISPERSIBLE IRON OXIDE RED PIGMENTS WITH HIGH GRINDING STABILITY

(75) Inventors: Carsten Rosenhahn, Krefeld (DE); Wilfried Burow, Krefeld (DE); Volker Schneider, Kürten (DE)

(73) Assignee: LANXESS Deutschland GmbH, Leverkusen (DE)

( * ) Notice: Subject to any disclaimer, the term of this patent is extended or adjusted under 35 U.S.C. 154(b) by 0 days.

(21) Appl. No.: 11/128,590

(22) Filed: May 13, 2005

(65) Prior Publication Data

US 2005/0274284 A1 Dec. 15, 2005

(30) Foreign Application Priority Data

May 14, 2004 (DE) .................. 10 2004 024 013

(51) Int. Cl.
*C09C 1/24* (2006.01)
*C01G 49/02* (2006.01)
*C08K 3/22* (2006.01)

(52) U.S. Cl. .................. 106/456; 106/419; 106/424; 106/459; 106/712; 162/162; 423/632; 424/464; 426/250; 427/215; 427/218; 427/289; 427/372.2; 427/427; 428/403; 428/404; 524/431

(58) Field of Classification Search .............. 106/419, 106/424, 456, 459, 712; 427/215, 289, 372.2, 427/427, 218; 428/403, 404; 423/632; 162/162; 424/464; 426/250; 524/431
See application file for complete search history.

(56) References Cited

U.S. PATENT DOCUMENTS

| | | | |
|---|---|---|---|
| 3,458,599 A | 7/1969 | Daumiller et al. ............ 260/879 |
| 3,904,708 A | 9/1975 | Kennedy et al. ............ 260/878 R |
| 3,933,942 A | 1/1976 | Kennedy et al. ............ 260/878 R |
| 4,234,348 A * | 11/1980 | Brunn et al. ................ 106/459 |
| 4,620,879 A | 11/1986 | Burow et al. ................ 106/304 |
| 4,753,680 A | 6/1988 | Burow et al. ................ 106/304 |
| 4,911,760 A * | 3/1990 | Burow et al. ................ 106/459 |
| 5,049,195 A * | 9/1991 | Burow et al. ................ 106/456 |
| 5,059,250 A * | 10/1991 | Burow et al. ................ 106/459 |
| 5,264,494 A | 11/1993 | Ho et al. ....................... 525/237 |
| 5,314,958 A | 5/1994 | Himori ......................... 525/256 |
| 6,179,908 B1 * | 1/2001 | Braun et al. ................ 106/456 |
| 6,231,661 B1 * | 5/2001 | Hayashi et al. ............. 106/456 |
| 2001/0009948 A1 | 7/2001 | Hopkins et al. ........... 525/330.7 |
| 2003/0171478 A1 | 9/2003 | Resendes ..................... 524/492 |

FOREIGN PATENT DOCUMENTS

| | | | |
|---|---|---|---|
| DE | 2255464 A * | 5/1973 |
| EP | 0419964 A2 * | 4/1991 |
| GB | 865297 | 11/1959 |
| JP | 51-47923 | 4/1976 |
| WO | 01/09225 | 2/2001 |

OTHER PUBLICATIONS

Fuller, Carl W., "Colored Iron Oxide Pigments, Synthetic," T.C. Patton Pigment Handbook, vol. 1, 1973, p. 333, no month.

* cited by examiner

*Primary Examiner*—Anthony J. Green
(74) *Attorney, Agent, or Firm*—Nicenor A. Kohnoke; Norman B. Thot

(57) ABSTRACT

The present invention relates to pure-coloured, readily dispersible iron oxide red pigments having high grinding stability, to a process for preparing them, and to their use.

13 Claims, 4 Drawing Sheets

25μm

<10/25/35μm

15/-/-μm

10/25/-μm

<10/-/30 μm

<10/25/35μm

PURE-COLOURED, READILY DISPERSIBLE IRON OXIDE RED PIGMENTS WITH HIGH GRINDING STABILITY

The present invention relates to pure-coloured, readily dispersible iron oxide red pigments with high grinding stability, to a process for preparing them, and to their use.

Iron oxide red pigments are used universally as colouring components in the paint, varnish, coating, building material, plastics and paper industries.

Iron oxide red pigments have advantages over organic red pigments. They can be produced by cost-effective preparation processes, are environmentally unobjectionable, are stable to light, are more readily dispersible, and protect coloured articles against damaging UV radiation.

Exacting requirements are imposed on the iron oxide red pigments in terms of colour purity, consistency of quality, and ease of processing (dispersibility, grinding stability).

In all applications for colouring varnishes, emulsion paints, coatings, plastics, building materials, paper, in foods and in products of the pharmaceutical industry, there is demand for iron oxide red pigments whose red component a* (measured in a mixture with white pigments—called reduction—according to CIELAB) is particularly pronounced. The higher the red component a* determined for the coloration, the purer in colour the red shade of the coloured medium appears (for example varnish, plastic, coatings, building material, paper).

Thus in the coatings industry a requirement which is imposed is that the incorporation of the iron oxide red pigments into a coating system should always lead to coloration in a consistent shade, which as far as possible should be independent of the duration of incorporation. The iron oxide red pigment is incorporated into a coating system in industrial installations, such as bead mills, in which the pigment is exposed to mechanical forces, this grinding possibly taking hours. A high measure of consistency of colour and/or quality is provided if the colour imparted by the iron oxide red pigment alters as little as possible in the event of fluctuations in the incorporation time. Iron oxide red pigments exhibiting little change in shade when the incorporation time is prolonged in a coating system have a high grinding stability. One measure of the consistency of colour is the hue distance $\Delta h\ ab^*$ which arises when the hue of two paint dispersions obtained from the same paint and pigment base materials in the same industrial installation, but with different incorporation times, is compared. The requirement here is for the resultant hue difference $\Delta h\ ab^*$ to be as low as possible.

Moreover, in paint or plastics applications, for example, there is a requirement that the iron oxide red pigments should be uniformly distributed as easily as possible in the medium, in the form of primary particles; in other words, that they should be readily dispersible. What are not wanted are coarse pigment particles, which in applied paint films or coloured plastics lead, owing to their particle size, to rough surfaces ("pickling") or defects.

Red iron oxide pigments are prepared employing, generally, four methods (T. C. Patton, Pigment Handbook, Vol. 1, 1973, p. 333):

1. Copperas Red Method

Elimination of water and sulphur oxides from iron sulphate (copperas) in a multi-stage operation gives pure-coloured and readily dispersible iron oxide red pigments with inadequate grinding stability.

2. Ferrite Red Method

Dehydration of yellow iron oxide (goethite), $\alpha$-FeOOH, gives iron oxide red pigments having good dispersibility but inadequate colour purity and inadequate grinding stability.

3. Precipitated Red Method

Direct precipitation of iron oxide red from aqueous solution gives iron oxide pigments having good dispersibility but inadequate colour purity and inadequate grinding stability.

4. Synthetic Red Method

Oxidation of synthetic black iron oxide (magnetite) gives iron oxide red pigments having good dispersibility and good grinding stability, but inadequate colour purity.

By means of a range of technical measures, attempts have been made in the past, starting from the known preparation methods, to produce improved iron oxide colour pigments.

For instance, DE 35 121 24 A1 and JP 47923/76 (Tone Sangyo) describe processes for coating iron oxide red pigments with a colourless coating of 0.5 to 10 mol % of Mg, Zn, Al, La, Y, Zr, Sn and Ca (DE 35 121 24 A1) or 0.3% to 10% of Al (JP 47923/76). The coating leads to iron oxide red pigments having improved colour properties as compared with those of the uncoated iron oxide red pigments, and having good dispersibility and an isoelectric point >7. Iron oxide red pigments prepared in this way are distinguished by reduced flocculation as compared with the uncoated iron oxide red pigment starting materials used, but do not achieve the desired high colour purity.

Moreover, EP 0 290 908 A1 describes a process for preparing pure-coloured iron oxide red pigments having clustered pigment particles. These pure-coloured iron oxide red pigments are obtained by dehydrating yellow iron oxide (goethite=$\alpha$-FeOOH) which has been obtained, by a specific precipitating operation, in the form not of acicular, but instead of spherolitic iron oxide yellow. The Al-containing iron oxide red pigments thus obtained, although purer in colour than conventional iron oxide yellow pigments calcined to red, and also stable to grinding, are nevertheless difficult to disperse.

Furthermore, DE 35 00 470 A1 describes a process for preparing pure-coloured iron oxide red pigments by oxidizing black iron oxide, this process leading to pigments purer in colour than conventional iron oxide red pigments prepared on the basis of conventional magnetite. The process starts out from specific, finely divided magnetites, produced in the presence of high amounts of Fe(III) in aqueous media, these magnetites possibly having been produced in the presence of aluminium salts or phosphate salts. The iron oxide red pigments obtained after oxidation, possibly including aluminium or phosphorus as dopants, are stable to grinding and readily dispersible, but do not achieve the desired colour purity.

It is therefore clear that neither by means of the four abovementioned methods (T. C. Patton, Pigment Handbook, Vol. 1, New York 1973, p. 333) of preparing red iron oxide pigments nor by modifications to the methods, such as coating of iron oxide red pigments with colourless aluminium compounds, nor by doping with aluminium and phosphorus, are improved iron oxide red pigments obtained which differ in their advantageous combination of properties, comprising high colour purity at the same time as high grinding stability and good dispersibility, from conventionally known iron oxide red pigments.

The object on which the invention is based was to provide improved iron oxide red pigments which exhibit not only high colour purity but also high grinding stability and good dispersibility.

Figure 1:
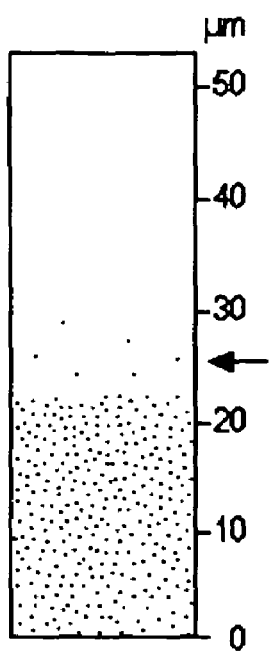
FIG. 1 shows individual bits or scratches.

This object has been achieved in the form of iron oxide red pigments having an a* value, measured in white reduction (mixed with white paste) according to CIELAB units in accordance with DIN 6174, after 15 minutes of dispersing in an Olbrich shaker, of from 26.5 to 30, in particular from 26.5 to 28.5, which on paint dispersion in an Olbrich shaker, with an increase in the dispersing time from 15 to 120 minutes, exhibit a hue difference Δhab* in accordance with DIN 6174 of <1.1, in particular <0.8.

The iron oxide red pigments, on paint dispersion in an Olbrich shaker with an increase in the dispersing time from 15 to 120 minutes, preferably exhibit a shade difference Δa in accordance with DIN 6174 of <0.8, in particular <0.6.

The iron oxide red pigments, on paint dispersion in an Olbrich shaker with an increase in the dispersing time from 15 to 120 minutes, preferably exhibit a shade difference Δb in accordance with DIN 6174 of <1.8, in particular <1.3.

The iron oxide red pigments further exhibit, as compared with Bayferrox® 110 M, with a dispersion time of 15 minutes in an Olbrich shaker, an a* value which is advantageously higher by 0.5 to 4 units, as measured in white reduction according to CIELAB units in accordance with DIN 6174. Preferably the iron oxide red pigments, as compared with Bayferrox 110 M, with a dispersion time of 15 minutes in an Olbrich shaker, have an a value which is higher by 0.7 to 2 units, measured in white reduction according to CIELAB units in accordance with DIN 6174. Furthermore, on paint dispersion in an Olbrich shaker with an increase in the dispersing time from 15 to 120 minutes, the iron oxide red pigments have a hue difference Δh ab* in accordance with DIN 6174 of <1.1, in particular <0.8, or a shade difference Δa* in accordance with DIN 6174 of <0.8, in particular <0.6, or a shade difference Δb* in accordance with DIN 6174 of <1.8, in particular <1.3. Bayferrox® 110 M (CAS No. 1309-37-1 from Bayer Chemicals AG) in the sense of the invention denotes a powdery, red $Fe_2O_3$ pigment having a density of about 5 g/cm$^3$ (measured at 20° C. in accordance with DIN ISO 787/10) and a pH of 4-8 at 50 g/l water in aqueous suspension in accordance with DIN ISO 787/9; it is used as a colorant.

The iron oxide red pigments preferably have a dispersibility according to DIN ISO 1524 (2002) in the extended form, as the "3-box" method, of better than 15-25-40.

The iron oxide red pigments comprise preferably clustered pigment particles whose clusters comprise at least five bead-like parts merged with one another.

The iron oxide red pigments contain preferably 0.5 to 10 mol % of a compound from the group Mg, Zn, Al, La, Y, Zr, Sn and/or Ca, based on the iron oxide red pigments.

Mg, Zn, Al, La, Y, Zr, Sn and/or Ca are preferably present on the surface and in the iron oxide red pigment.

The invention also provides a process for preparing iron oxide red pigments, characterized in that an iron oxide yellow pigment built up on the basis of an iron oxide yellow seed
is coated in the presence of Mg, Zn, Al, La, Y, Zr, Sn and/or Ca, in particular by spraying on, grinding on and/or precipitating on, so that the amount of elements from the group Mg, Zn, Al, La, Y, Zr, Sn and/or Ca is 0.5 to 10 mol %, based on the total iron content of the iron oxide yellow pigment;
the iron oxide yellow pigment is calcined to give red clinker;
and the red clinker is ground to iron oxide red pigment.

The iron oxide yellow pastes used as precursors may be prepared preferably in accordance with DE 3 326 632 A1, and comprise highly branched pigment particles.

A preferred process for preparing the iron oxide pigments of the invention is characterized in that the preparation of the iron oxide yellow seed of the iron oxide yellow pigment (α-FeOOH) intended for coating takes place in the presence of compounds of the elements B, Al, Ga, Si, Ge and/or Sn in amounts of 0.05% to 10% by weight, calculated as oxides in accordance with the maximum valency of the elements, based on the arithmetically precipitated α-FeOOH seed, the pigment formation step takes place in a manner customary for the skilled person, the salt liquor is separated from the resultant yellow slurry, and the isolated iron oxide yellow paste is coated prior to calcining to give the iron oxide red pigment.

In this process, first of all, preferably in accordance with DE 3 326 632 A1, a seed is produced with degrees of precipitation of from 20% to 70% in the presence of compounds of the elements B, Al, Ga, Si, Ge and/or Sn at temperatures from room temperatures up to 70° C. A pigment is grown on this seed. Pigment formation to form iron oxide yellow may take place by the method of Penniman in the presence of metallic iron, by the aniline method or by the precipitation method. In the case of the precipitation method it is possible to use iron salts purified by preprecipitation.

In the case of the precipitation method the pigment is formed preferably at constant pH in the range 2.8 to 4.5 or with stepwise increase in pH, in the course of pigment formation, from levels <3 in units of 0.1 to 0.2/step to levels of 3.8 to 4.5.

After the end of pigment formation, the products, in the form of a precursor to the preparation of the innovative iron oxide red pigments, comprise salt-containing yellow slurries, which can be washed preferably to low salt content and, if desired, can be dried.

The coating of the yellow pigments obtained as an intermediate in accordance with the invention with a colourless coating of 0.5 to 10 mol % of Mg, Zn, Al, La, Y, Zr, Sn and Ca takes place in such a way that a coating of a compound of one or more elements from the group Mg, Zn, Al, La, Y, Zr, Sn and Ca is formed on the iron oxide yellow pigments by spraying on, grinding on and/or precipitating on, such that the amount of elements from the group Mg, Zn, Al, La, Y, Zr, Sn and Ca is 0.5 to 10 mol %, based on the total iron content of the yellow pigments.

When the coated intermediate is calcined, the particle size of the intermediate, the nature and amount of the coating, the temperature profile and the residence time all affect, in a known way, the colouristic properties of the resultant iron oxide red pigment.

The oven product, the red clinker, is ground in a way which is usual in the art, the skilled person being able to select from a multiplicity of grinding apparatus. By way of example, but without limitation, mention may be made of air jet mills, steam jet mills, Raymond mills and bead mills.

Surprisingly, the iron oxide red pigments obtained after grinding differ from conventional, known iron oxide red pigments in high colour purity in combination with high grinding stability and good dispersibility.

The invention also provides for the use of the iron oxide red pigments for colouring products of the paint, varnish, coatings, building material, plastics and paper industries. The iron oxide red pigments of the invention can be used, further, in foods and in products of the pharmaceutical industry, such as in tablets, for example.

The invention is illustrated in more detail with reference to the following examples, without any intention that these examples should impose any restriction on the invention.

EXAMPLES

Description of the Measurement Methods Used

The tests were carried out by way of example in a medium-oil alkyd resin (Alkydal® F 48, Bayer Polymers, Leverkusen). For dispersion, the pigment preparation was premixed in a dissolver, in a manner known to the skilled person, and then shaken in an rm5000 paint mixer from Olbrich, D-58675 Hemer, with glass beads (Ø 1 mm) for the times indicated. The pigment pastes were let down and applied with a manual coating bar in a film thickness of 120 µm to a coated white card. To investigate the reduction, the mixture of red paint and white paint was applied in the same way to a coated white card. After drying at room temperature for at least 16 hours, the samples were evaluated calorimetrically. Colorimetry took place using a Dataflash® 2000 from Datacolor. The colour differences were determined according to DIN 6174 (CIELAB values).

Preparation of the Red Pigment Paste

Weigh out 87.5 g of medium-oil, air-drying alkyd resin based on drying vegetable fatty acids in white spirit/xylene, Bayer Polymers AG, 6.0 g of aromatic hydrocarbon mixture, consisting primarily of trimethyl-, propyl- and methylethyl-benzyenes (with the formula $C_6H_3(CH_3)_3$) and 175 g of red pigment into a 250 ml tinplate can (7.5 cm) and predisperse with a dissolver at 5000 rpm for 10 minutes (disc 4 cm; peripheral speed about 10.5 m/s).

Weigh out 140 g of the above mixture and 230 g of glass beads into a 250 ml wide-neck glass bottle with screw closure, and shake with an rm5000 colour mixer, Olbrich ("Olbrich shaker" below). After the end of the dispersing time, remove glass beads by sieving, and let down pigment paste.

Preparation of the Letdown Solution

Weigh out 253.9 g of medium-oil, air-drying alkyd resin based on drying vegetable fatty acids in white spirit/xylene, Bayer Polymers AG, 20.6 g of solvent naphtha 100, 5.7 g of methoxypropyl acetate, 2.4 g of anti-skinning agent containing 2-butanone oxime, 55% in white spirit, Borchers GmbH, 4.9 g of silicone-based levelling assistant containing polydimethylsiloxane and octamethylcyclotetrasiloxane, Borchers GmbH, 1% in xylene, and 11.3 g of mixed metal dryer (siccative) containing cobalt octoate, calcium octoate, zinc octoate and zirconium octoate as a mixture in solution in white spirit with an aromatics content of not more than 1%, Borchers GmbH, into a suitable vessel and homogenize thoroughly.

Letdown

Mix 7.5 g of pigment paste and 16.0 g of letdown solution thoroughly in a suitable vessel.

Preparation of the White Paint for Reduction

Weigh out 35.0 g of medium-oil, air-drying alkyd resin based on drying vegetable fatty acids in white spirit/xylene, Bayer Polymers AG, 30.0 g of solvent naphtha 100, 100 g of titanium dioxide white pigment, Kerr McGee and 230 g of glass beads into a 250 ml wide-neck glass bottle with screw closure and shake for 30 minutes with an rm5000 paint mixer from Olbrich. After the end of the dispersing time, remove glass beads by sieving, and let down pigment with a homogeneous mixture of 226.2 g of medium-oil, air-drying alkyd resin based on drying vegetable fatty acids in white spirit/xylene, Bayer Polymers AG, 16.0 g of solvent naphtha 100, 8.0 g of methoxypropyl acetate, 2.15 g of anti-skinning agent containing 2-butanone oxime, 55% in white spirit, Borchers GmbH, 4.3 g of silicone-based levelling assistant, Borchers GmbH, 1% in xylene, and 10.0 g of mixed metal dryer (siccative) containing cobalt octoate, calcium octoate, zinc octoate and zirconium octoate as a mixture in solution in white spirit with an aromatics content of not more than 1%, Borchers GmbH.

Preparation of the White Tint (Reduction)

Mix 2.76 g of red paint with 10.76 g of white paint thoroughly in a suitable vessel.

Determination of Dispersibility

The paint dispersed in the Olbrich shaker by the method described above is placed on the top end of the grindometer block, which has been wiped clean shortly beforehand, and is drawn down slowly with the scraper at right angles. The particle size must be read off immediately. The evaluation is made along the lines of DIN ISO 1524 (2002) in the extended form as the "3-box" method in accordance with test method No. 004 of 1995-May-15 (Bayer Chemicals, Business Unit Inorganic Pigments), as follows:

| Equipment | Pendraulik stirrer, dissolver disc, Ø 40 mm |
| --- | --- |
| | Tinplate can, 250 ml |
| | Grindometer block, 0–100 µm |
| | Balance |
| | Kitchen timer |
| | Spatula |
| | Small bottle with snap-on lid |
| Auxiliaries | Alkydal ® F 681, 75% in white spirit |
| | Alkydal ® F 681, 45% in white spirit |
| Procedure | |

Millbase Formulations of the Bayferrox Pigments

| | Red and black pigments | Yellow pigments |
| --- | --- | --- |
| Alkydal ® F 681, 75% | 100 g | 110 g |
| Bayferrox ® | 220 g | 70 g |
| exception: 110 M | 180 g | |

Binder is charged to the stirring vessel and the pigment is added in portions at 1000 rpm and stirred in. The stirrer shaft, dissolver disc and edge of the can are cleaned to remove unwetted pigment particles, using the spatula or sheet of card. The dispersing apparatus in the stirrer is then fixed concentrically, maintaining the distance from the base, and the millbase is dispersed at 5000 rpm for 10 minutes.

In a small sealable bottle the millbase is mixed thoroughly with a 45% strength Alkydal® F 681 binder solution in white spirit in a ratio of 1:1. The diluted sample is placed on the top end of the grindometer block, which has been wiped clean shortly beforehand, and is drawn down slowly at right angles using the scraper. The uniform drawing of the scraper spreads the sample in the groove, which has a division of 0-100 µm. The particle size must be read off immediately.

Evaluation

The method is described in DIN ISO 1524, "determination of fineness of grind (particle size)", and as a characteristic value, accordingly, the value is read off (in µm) "below which a relatively large number of pigment particles become visible as bits or scratches on the surface (of the spread-out paint). Individual bits or scratches that may have occurred are not taken into account in this consideration (FIG. 1)."

The "3-box" method employed for testing the pigments is an extended form of reading off, in which three values are reported as the result.

Figure 2:
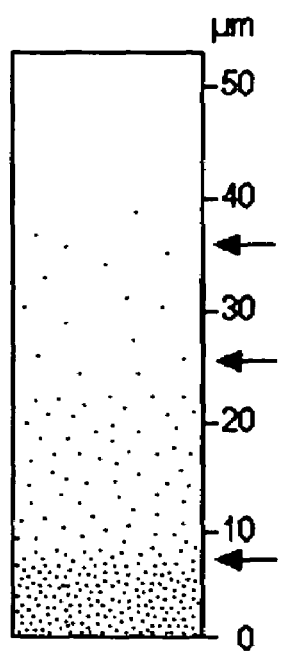
FIG. 2 shows a spread of where DIN ISO 1524 readings have been taken at as indicated by the arrows to acquire a "3-box" method readout of <10/25/35 µm.

The main region in the form of a close coherent array of bits, above it a region with a moderately high concentration of bits, and finally, over that, a region with a very low concentration of bits (virtually individual bits, but which occur reproducibly) (FIG. 2).

Therefore, a trio of values is recorded, which characterizes the upper limits of the three regions indicated. A grindometer spread according to FIG. 2 is assessed, accordingly, as follows: <10/25/35 µm.

Figure 3:
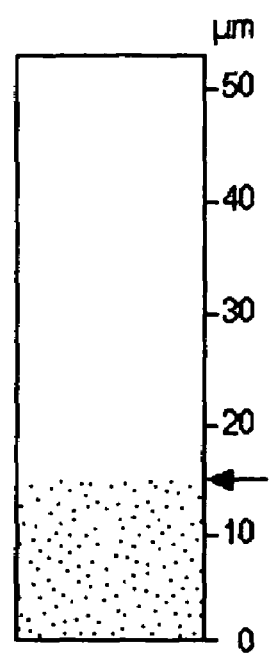
FIG. 3 shows a spread of where DIN ISO 1524 readings have been taken at the arrow to acquire a "3-box" method readout of 15/-/-µm.
Figure 4:
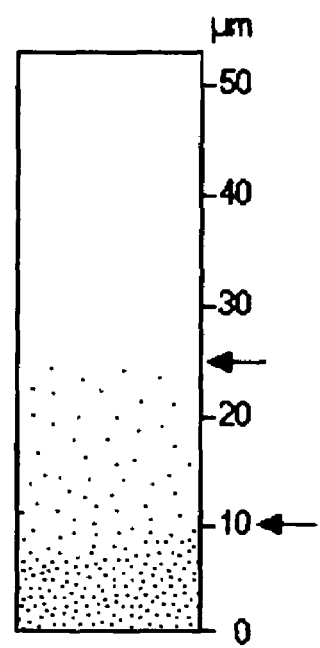
FIG. 4 shows a spread of where DIN ISO 1524 readings have been taken at as indicated by the arrows to acquire a "3-box" method readout of 10/25/-µm.
Figure 5:
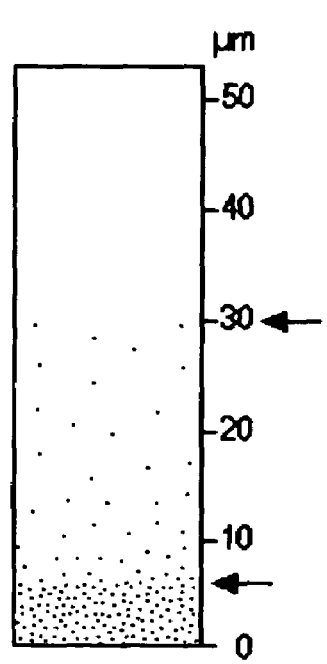
FIG. 5 shows a spread of where DIN ISO 1524 readings have been taken at as indicated by the arrows to acquire a "3-box" method readout of <10/-/30 µm.

By virtue of their position within the three-point system, the three values clearly indicate to what kind of the three arrays of bits they can be assigned. If, in specific cases, one of the three regions does not appear, then a line (for examples of this see FIGS. 3, 4 and 5) appears at the point in question.

Figure 6:
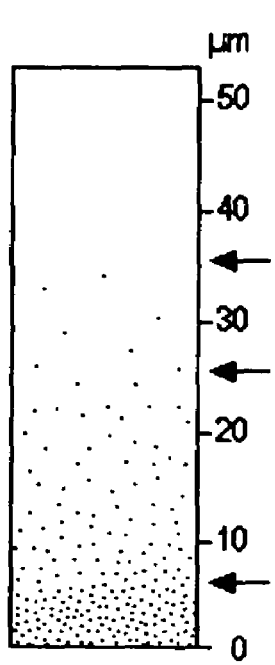
FIG. 6 shows a spread of where DIN ISO 1524 readings have been taken at as indicated by the arrows to acquire a "3-box" method readout of <10/25/35 µm.

If the concentration of bits within a region is remarkably high (but without reaching the density of the adjacent region), this can be indicated by underlining the limit value in question. An example of this is shown in FIG. 6 (in comparison to FIG. 2).

Example 1 (Comparative)

The iron oxide yellow pastes or suspensions used as precursors were prepared in accordance with DE-A 3 326 632 A1, Example 2, and comprise highly branched pigment particles.

The material, obtained in the form of suspension or paste, is filtered through a filter press and subsequently washed with fully deionized water until the filtrate has a conductivity of <2 mS. 50 kg of the filtercake are stirred out with 50 l of water in a 150 l cask and subsequently dried. 5 kg of the dried material were subsequently calcined at 740° C. (measured in the product) in a suitable apparatus for 30 minutes after reaching the product temperature.

The calcined material was introduced into a coating drum, and 1 g of 50% strength trimethylolpropane solution in water was sprayed on uniformly per 100 g of pigment, using a two-fluid nozzle. Subsequent steam jet milling was carried out in a steam jet mill from Alpine (internal diameter: 25 cm) with a product feed of 10 kg/h for 18 kg/h propulsion steam and 45 kg/h grinding steam.

Example 2

The iron oxide yellow pastes used as precursors were prepared in accordance with DE-A 3 326 632 A1, Example 2, and comprise highly branched pigment particles.

The material, obtained as suspension or paste, is filtered via a filter press and subsequently washed with fully deionized water until the conductivity of the filtrate is <2 mS. 50 kg of the filtercake are stirred out with 50 l of water in a 150 l cask and subsequently, with stirring, 1.07 l of aluminium sulphate solution (concentration 100 g/l Al, calculated as $Al_2O_3$) are added over the course of 15 minutes. Following the addition the pH of the suspension was 3.2. Subsequently 0.723 l of sodium aluminate solution (concentration 300 g/l, calculated as $Al_2O_3$) was added over the course of 15 minutes. The pH of the suspension was subsequently 7.03. Finally a pH of 8.5 was set using sodium hydroxide solution (NaOH), followed by stirring for 60 minutes more. Following the subsequent stirring period, the batch was filtered via a filter press and the solid product was washed with water to a conductivity of <500 µS. The filtercake was subsequently dried at 120° C. 5 kg of the dried material was subsequently calcined at 750° C. (measured in the product) in a suitable apparatus for 30 minutes after reaching the product temperature.

The calcined material was introduced into a coating drum, and 1 g of 50% strength trimethylolpropane solution in water was sprayed on uniformly per 100 g of pigment, using a two-fluid nozzle. Subsequent steam jet milling took place in a steam jet mill from Alpine (internal diameter: 25 cm) with a product feed of 10 kg/h for 18 kg/h propulsion steam and 45 kg/h grinding steam.

The finished material obtained in this way was tested in accordance with the methods indicated above.

Example 3

The iron oxide yellow pastes used as precursors were prepared in accordance with DE-A 3 326 632 A1, Example 2, and comprise highly branched pigment particles.

The material, obtained as suspension or paste, is filtered via a filter press and subsequently washed with fully deionized water until the conductivity of the filtrate has is <2 mS. 50 kg of the filtercake are stirred out with 50 l of water in a 150 l cask and subsequently, with stirring, 2.14 l of aluminium sulphate solution (concentration 100 g/l Al, calculated as $Al_2O_3$) are added over the course of 15 minutes. Following the addition the pH of the suspension was 3.08. Subsequently 1.45 l of sodium aluminate solution (concentration 300 g/l, calculated as $Al_2O_3$) were added over the course of 15 minutes. The pH of the suspension was subsequently 8.4. Finally a pH of 8.5 was set using sodium hydroxide solution (NaOH), followed by stirring for 60 minutes more. Following the subsequent stirring period, the batch was filtered on a filter press and the solid product was washed with water to a conductivity of <500 µS. The filtercake was subsequently dried at 120° C. 5 kg of the dried material was subsequently calcined at 790° C. (measured in the product) in a suitable apparatus for 30 minutes after reaching the product temperature.

The calcined material was introduced into a coating drum, and 1 g of 50% strength trimethylolpropane solution in water was sprayed on uniformly per 100 g of pigment, using a two-fluid nozzle. Subsequent steam jet milling took place in a steam jet mill from Alpine (internal diameter: 25 cm) with a product feed of 10 kg/h for 18 kg/h propulsion steam and 45 kg/h grinding steam.

The finished material obtained in this way was tested in accordance with the methods indicated above.

Example 4

The iron oxide yellow pastes used as precursors were prepared in accordance with DE-A 3 326 632 A1, Example 2, and comprise acicular, highly branched pigment particles.

The material, obtained as suspension or paste, is filtered via a filter press and subsequently washed with fully deionized water until the conductivity of the filtrate is <2 mS. 50 kg of the filtercake are stirred out with 50 l of water in a 150 l cask and subsequently, with stirring, 3.21 l of aluminium sulphate solution (concentration 100 g/l Al, calculated as $Al_2O_3$) are added over the course of 15 minutes. Following the addition the pH of the suspension was 3.14. Subsequently 1.34 l of sodium aluminate solution (concentration 300 g/l, calculated as $Al_2O_3$) were added over the course of 15 minutes. The pH of the suspension was subsequently 5.4. Finally a pH of 8.5 was set using sodium hydroxide solution (NaOH), followed by stirring for 60 minutes more. Following the subsequent stirring period, the batch was filtered via a filter press and the solid product was washed with water to a conductivity of <500 μS. The filtercake was subsequently dried at 120° C. 5 kg of the dried material was subsequently calcined at 800° C. (measured in the product) in a suitable apparatus for 30 minutes after reaching the product temperature.

The calcined material was introduced into a coating drum, and 1 g of 50% strength trimethylolpropane solution in water was sprayed on uniformly per 100 g of pigment, using a two-fluid nozzle. Subsequent steam jet milling took place in a steam jet mill from Alpine (internal diameter: 25 cm) with a product feed of 10 kg/h for 18 kg/h propulsion steam and 45 kg/h grinding steam.

The finished material obtained in this way was tested in accordance with the methods indicated above.

Comparative Examples

Comparison pigment is the commercially available Copperas Red® R1599D from Elementis.

All of the examples and comparative examples given in Table 1, and also the comparison pigment R1599D, have a more pronounced red value a* than Bayferrox® 110 M from Bayer Chemicals AG, which was measured at a* =25.66 in F48 reduction at 15 minutes in an Olbrich shaker in accordance with DIN 6174. Bayferrox® 10 M from Bayer Chemicals AG serves as a reference for the colour locus a* for the specified examples and comparative examples. By simple formation of differences between the a* values determined for 15 minutes in the Olbrich shaker and the a* value of 25.66 for Bayferrox® 110 M, it is possible to calculate the difference in shade between the comparison pigment of the comparative examples and the inventive examples.

TABLE 2

Comparison of dispersibility

| Sample | Dispersing time | Dispersing value in μm |
| --- | --- | --- |
| Example 1 comparative | 30' Olbrich shaker | 15–30–40 |
| Example 2 | 30' Olbrich shaker | 10–25–30 |
| Example 3 | 30' Olbrich shaker | <10–15–30 |
| Example 4 | 30' Olbrich shaker | <10–15–25 |
| R1599D | 30' Olbrich shaker | <10–10–20 |

Figure 7:
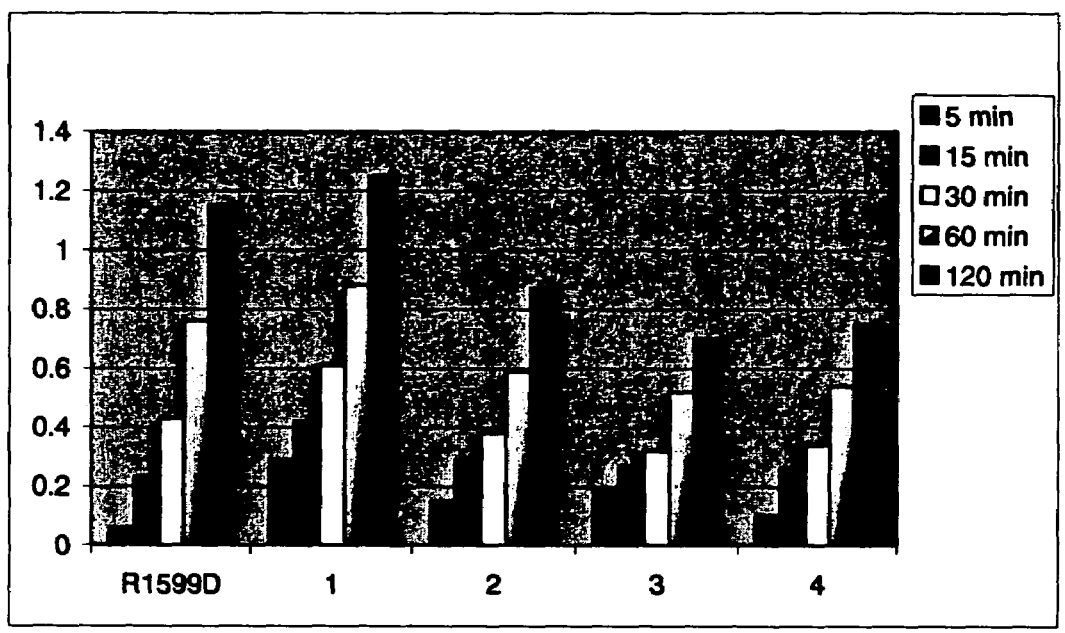
FIG. 7 shows the effect of dispersing time on a*.

FIG. 7 shows the effect of dispersing time on a*. The y axis shows the change of a*, while the x axis shows the time spacings of 5 min, 15 min, 30 min, 60 min and 120 min, in each case for the pigments R1599D, Example 1 (comparative), Example 2, Example 3 and Example 4.

Figure 8:
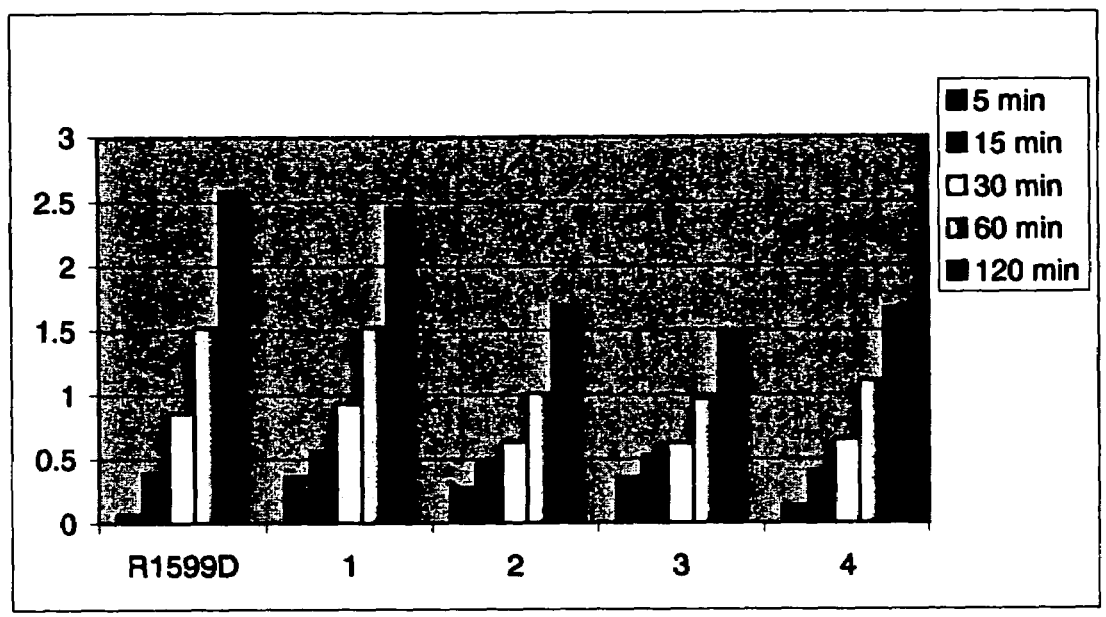
FIG. 8 shows the effect of dispersing time on b*.

FIG. 8 shows the effect of dispersing time on b*. The y axis shows the change of b*, while the x axis shows the time spacings of 5 min, 15 min, 30 min, 60 min and 120 min, in each case for the pigments R1599D, Example 1 (comparative), Example 2, Example 3 and Example 4.

Figure 9:
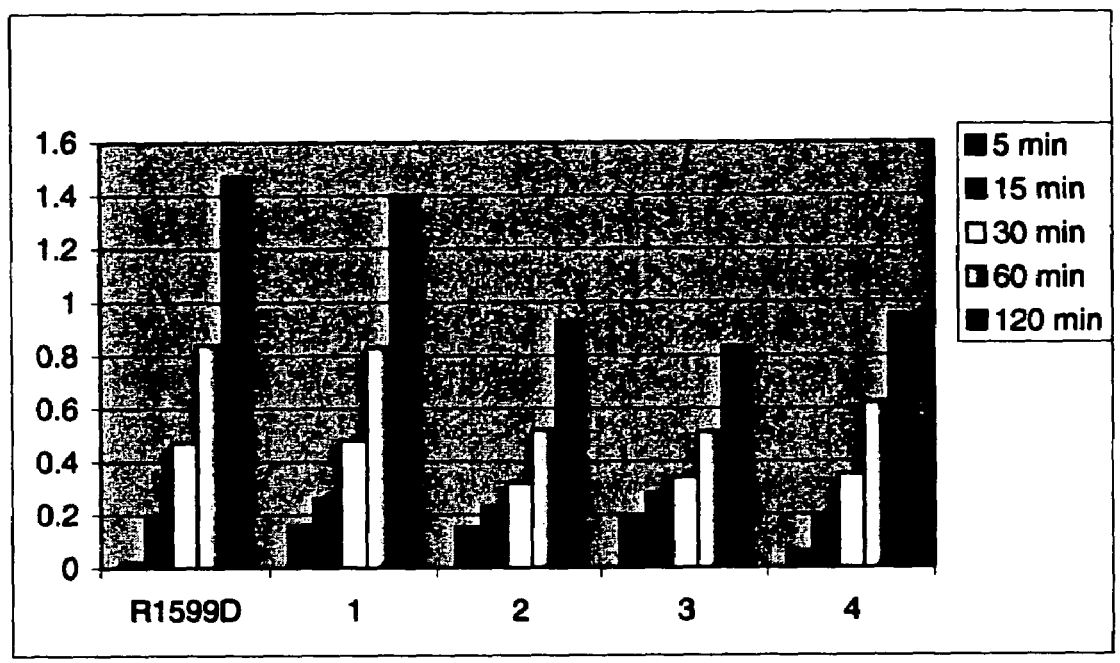
FIG. 9 shows the effect of dispersing time on h*.

FIG. 9 shows the effect of dispersing time on h*. The y axis shows the change of h*, while the x axis shows the time spacings of 5 min, 15 min, 30 min, 60 min and 120 min, in each case for the pigments R1599D, Example 1 (comparative), Example 2, Example 3 and Example 4.

TABLE 1

Test results
Testing in F48 (reduction) in accordance with DIN 6174; Report in CIELAB units

| Sample | Dispersion Olbrich shaker (in minutes) | a* | b* | Shade difference Δ a* in comparison to 10-minute dissolver dispersion | Shade difference Δ b* in comparison to 10-minute dissolver dispersion | Hue difference Δ h* in comparison to 10-minute dissolver dispersion |
| --- | --- | --- | --- | --- | --- | --- |
| R1599D | 15' | 27.04 | 18.35 | 0.23 | 0.39 | 0.20 |
| R1599D | 120' | 28.01 | 21.14 | 1.15 | 2.58 | 1.47 |
| Example 1 Comparative | 15' | 26.57 | 16.71 | 0.42 | 0.56 | 0.26 |
| Example 1 Comparative | 120' | 27.42 | 19.00 | 1.25 | 2.45 | 1.40 |
| Example 2 | 15' | 26.73 | 28.21 | 0.29 | 0.46 | 0.23 |
| Example 2 | 120' | 27.17 | 19.42 | 0.87 | 1.69 | 0.93 |
| Example 3 | 15' | 26.56 | 18.50 | 0.27 | 0.52 | 0.28 |
| Example 3 | 120' | 27.13 | 20.02 | 0.70 | 1.48 | 0.83 |
| Example 4 | 15' | 26.56 | 18.49 | 0.26 | 0.40 | 0.19 |
| Example 4 | 120' | 27.19 | 20.37 | 0.75 | 1.67 | 0.95 |

FIGS. 7-9 demonstrate that the iron oxide red pigments of the invention exhibit a higher grinding stability than the prior art.

The invention claimed is:

1. Iron oxide red pigment having an a* value, measured in white reduction according to CIELAB units in accordance with DIN 6174, after a first dispersion of 15 minutes in an Olbrich shaker, of from 26.5 to 30, and a $\Delta h\ ab^*$ measured in accordance with DIN 6174, after a second dispersion of 15 to 120 minutes of <1.1.

2. The Iron oxide red pigment according to claim 1, characterized in that after the second dispersion time the pigment exhibits a shade difference, $\Delta a$ in accordance with DIN 6174, of <0.8.

3. The Iron oxide red pigment according to claim 1, characterized in that after the second dispersion time the pigment exhibits a shade difference, $\Delta b$ in accordance with DIN 6174, of <1.8.

4. The Iron oxide red pigment according to claim 1, characterized in that the iron oxide red pigment comprises clustered pigment particles wherein the clusters comprise at least five parts merged with one another.

5. The Iron oxide red pigment according to claim 1, characterized in that the iron oxide red pigment contains 0.5 to 10 mol % of at least one compound selected from the group consisting of Mg, Zn, Al, La, Y, Zr, Sn and Ca, based on the iron oxide red pigment.

6. The iron oxide red pigment according to claim 5, characterized in that the at least one compound selected from the group consisting of Mg, Zn, Al, La, V. Zr, Sn and Ca is present on a surface of the pigment and in the iron oxide red pigment.

7. Iron oxide red pigment according to claim 1, characterized in that the a value of the iron oxide pigment is from 26.5 to 28.5 and $\Delta h\ ab^*$ of 0.8.

8. Iron oxide red pigment according to claim 2, characterized in that the iron oxide red pigment exhibits a shade difference $\Delta a$ of <0.6.

9. Iron oxide red pigment according to claim 3, characterized in that the iron oxide red pigment exhibits a shade difference $\Delta b$ of <1.3.

10. A process for preparing the iron oxide red pigment according to claim 1 comprising:

preparing an iron oxide yellow pigment from an iron oxide yellow seed;

coating the iron oxide yellow pigment with at least one compound selected from the group consisting of Mg, Zn, Al, La, Y, Zr, Sn and Ca, by using at least one coating method selected from the group consisting of spraying on, grinding on and precipitating on wherein, an amount of the at least one compound selected from the group consisting of Mg, Zn, Al, La, Y, Zr, Sn and Ca is from 0.5 to 10 mol %, based on the total iron content of the iron oxide yellow pigment;

calcining the iron oxide yellow pigment to produce a red clinker; and grinding the red clinker to an iron oxide red pigment.

11. The process for preparing the iron oxide red pigment according to claim 10 wherein the iron oxide yellow seed is prepared from a salt liquor comprising α-FeOOH seed and at least one element selected from the group consisting of B, Al, Ga, Si, Ge and Sn in an amount of 0.05% to 10% by weight, wherein the weight at the elements are calculated as oxides of the elements at maximum valency wherein the at least one element is precipitated on the suface of the α-FeOOH seed to make the iron oxide yellow seed.

12. The process of using the iron oxide red pigment according to claim 1 comprising:

mixing the iron oxide red pigment with a matter selected from the group consisting of paint vanish, coatings, building material, plastics paper, food and pharmaceuticals.

13. The process of using the iron oxide red pigment according to claim 12, wherein the pharmaceuticals are tablets.

* * * * *